(12) United States Patent
Meyer et al.

(10) Patent No.: US 10,946,704 B2
(45) Date of Patent: *Mar. 16, 2021

(54) RAILROAD TRAILER CHASSIS

(71) Applicant: HARSCO TECHNOLOGIES LLC, Fairmont, MN (US)

(72) Inventors: Ryan Meyer, Fairmont, MN (US); Robert R. Schrunk, III, Fairmont, MN (US)

(73) Assignee: HARSCO TECHNOLOGIES LLC, Fairmont, MN (US)

(*) Notice: Subject to any disclaimer, the term of this patent is extended or adjusted under 35 U.S.C. 154(b) by 344 days.

This patent is subject to a terminal disclaimer.

(21) Appl. No.: 15/894,553

(22) Filed: Feb. 12, 2018

(65) Prior Publication Data
US 2018/0170132 A1    Jun. 21, 2018

Related U.S. Application Data

(63) Continuation of application No. 14/615,535, filed on Feb. 6, 2015, now Pat. No. 9,937,761.

(Continued)

(51) Int. Cl.
*B60F 1/04* (2006.01)
*E01B 31/17* (2006.01)

(52) U.S. Cl.
CPC ............ *B60F 1/046* (2013.01); *B60F 1/04* (2013.01); *B60F 1/043* (2013.01); *E01B 31/17* (2013.01); *B60F 2301/02* (2013.01)

(58) Field of Classification Search
CPC .. B60F 1/005; B60F 1/04; B60F 1/043; B60F 1/046; B60F 2301/02; B60F 2301/04; E01B 31/17

(Continued)

(56) References Cited

U.S. PATENT DOCUMENTS 452,680 A * 5/1891 Nixon .................. B60D 1/54
                                            213/85
1,709,248 A   4/1929 De Ybarrondo
(Continued)

FOREIGN PATENT DOCUMENTS

CN    101890962 A    11/2010
CN    103332082 A    10/2013
(Continued)

OTHER PUBLICATIONS

A Second Office Action issued by the PRC Patent Office dated Dec. 25, 2018 in connection with PRC patent application No. 201580017781.8.

(Continued)

*Primary Examiner* — Zachary L Kuhfuss
(74) *Attorney, Agent, or Firm* — Norton Rose Fulbright US LLP

(57) ABSTRACT

A railroad trailer chassis comprising two or more road axles, two or more rail axles operable to be moved between first and second positions, and a work unit. The railroad trailer chassis is operable to be driven or towed in a road mode when the two or rail axles are in their respective first positions. The railroad trailer chassis is operable to be driven or towed in a rail mode when the two or more rail axles are in their respective second positions. The work unit is operable to perform one or more railroad maintenance or operation functions when driven in the rail mode.

20 Claims, 11 Drawing Sheets

Related U.S. Application Data

(60) Provisional application No. 61/936,377, filed on Feb. 6, 2014.

(58) Field of Classification Search
USPC .......................................... 105/72.2, 215.2
See application file for complete search history.

(56) References Cited

U.S. PATENT DOCUMENTS

| | | | |
|---|---|---|---|
| 2,378,504 A * | 6/1945 | Roos | B60D 1/54 |
| | | | 280/491.3 |
| 2,482,564 A * | 9/1949 | Townsend | B60F 1/046 |
| | | | 105/215.2 |
| 2,896,553 A | 7/1959 | Whisler | |
| 3,249,067 A | 5/1966 | Keller | |
| 4,048,925 A | 9/1977 | Storm | |
| 4,103,622 A | 8/1978 | Thuerer | |
| 4,324,186 A | 4/1982 | Thuerer | |
| 4,468,966 A | 9/1984 | Bradshaw | |
| 4,497,257 A | 2/1985 | White, Jr. | |
| 4,520,735 A | 6/1985 | Field | |
| 5,525,098 A | 6/1996 | Jaeggi | |
| 5,756,903 A | 5/1998 | Norby et al. | |
| 5,868,078 A | 2/1999 | Madison | |
| 6,352,035 B1 | 3/2002 | Kashiwase et al. | |
| 8,997,657 B2 | 4/2015 | Meister | |
| 9,527,355 B1 * | 12/2016 | Blevins | B60D 1/46 |
| 9,937,761 B2 * | 4/2018 | Meyer | B60F 1/046 |
| 2002/0094762 A1 | 7/2002 | Mathison et al. | |
| 2003/0172837 A1 * | 9/2003 | Whiston | B61D 15/00 |
| | | | 105/215.2 |
| 2011/0204601 A1 | 8/2011 | Alvarino | |
| 2013/0305956 A1 * | 11/2013 | Jackson | B61C 13/00 |
| | | | 105/72.2 |
| 2014/0312595 A1 * | 10/2014 | Knowles | B60D 1/54 |
| | | | 280/491.3 |

FOREIGN PATENT DOCUMENTS

| | | |
|---|---|---|
| CN | 103373365 A | 10/2013 |
| DE | 19738720 C1 | 12/1998 |
| DE | 0955411 A1 | 11/1999 |
| DE | 10145330 A1 | 4/2003 |
| EP | 0675227 A1 | 10/1995 |
| EP | 1136288 A2 | 9/2001 |
| JP | 2000-313216 | 11/2000 |
| KR | 100701216 | 3/2007 |
| WO | 2012028895 | 3/2012 |

OTHER PUBLICATIONS

PRC Office Action issued by the PRC Patent Office dated Jul. 3, 2018 in connection with PRC patent application No. 201580017781.8.

An extended European search report issued by the EPO dated Nov. 10, 2017 in connection with European patent application No. 15745979.3.

The International Search Report & Written Opinion of corresponding PCT application PCT/US2015/014727 dated May 14, 2015.

An examination report issued by the European Patent Office dated Mar. 15, 2019 in connection with European patent application No. 15745979.3.

* cited by examiner

US 10,946,704 B2

RAILROAD TRAILER CHASSIS

CROSS REFERENCE TO RELATED APPLICATION

This application is a continuation application of application Ser. No. 14/615,535 filed on Feb. 6, 2015, which claims priority to U.S. Provisional Patent Application No. 61/936,377 entitled "RAILROAD TRAILER CHASSIS" filed on Feb. 6, 2014, each of which is incorporated herein by reference in their entirety.

TECHNICAL FIELD

The present disclosure generally relates to a rail trailer for performing maintenance or inspection operations, and more particularly to a railroad trailer chassis that may be towed on a road, driven on a road, towed on a rail, or driven on a rail to perform various functions on railroad tracks.

BACKGROUND

Railroads are typically constructed to include a pair of elongated, substantially parallel rails, which are coupled to a plurality of laterally extending ties. The ties are disposed on a ballast bed of hard particulate material such as gravel. Over time, normal wear and tear on the railroad may cause the rails to deviate from a desired profile.

Railroad maintenance equipment is often large, heavy equipment. However, in order to justify the size and the cost of large rail equipment, a railroad operator would need to maintain a large amount of railway track. In order for the rail equipment to be used on a particular portion of track, the rail equipment would need to be driven on the rail to the desired location or shipped to the desired location on a specialty shipping trailer. However, rail equipment is often slow moving and special shipping permits may be needed to ship a full-sized rail equipment. Even after shipping rail equipment in a specialty trailer, a crane may be needed to lift the rail equipment from the trailer to set the rail equipment onto the tracks.

Therefore, smaller, more maneuverable railroad equipment that may be used on both the rail and the road is desired.

BRIEF SUMMARY

The present disclosure is related to a railroad trailer chassis. The railroad trailer chassis described herein may be a trailer capable of being towed on roads, driven on roads, towed on rails, or driven on rails. In one embodiment, the railroad trailer chassis may have a cab and a work unit capable of being driven under its own power or towed from a foldable towing hitch.

A railroad trailer chassis comprising two or more road axles, two or more rail axles operable to be moved between first and second positions, and a work unit. The railroad trailer chassis is operable to be driven or towed in a road mode when the two or rail axles are in their respective first positions. The railroad trailer chassis is operable to be driven or towed in a rail mode when the two or more rail axles are in their respective second positions. The work unit is operable to perform one or more railroad maintenance or operation functions when driven in the rail mode.

BRIEF DESCRIPTION OF THE DRAWINGS

Embodiments are illustrated by way of example in the accompanying figures, in which like reference numbers indicate similar parts, and in which.

DETAILED DESCRIPTION

Various embodiments of a railroad trailer chassis and methods of using such a railroad trailer chassis according to the present disclosure are described. It is to be understood, however, that the following explanation is merely exemplary in describing the devices and methods of the present disclosure. Accordingly, several modifications, changes, and substitutions are contemplated.

In the embodiments described herein, the railroad trailer chassis is a drivable trailer. The railroad trailer chassis may be configured to perform any railroad maintenance or inspection operations. The railroad trailer chassis is capable of being towed on a road at highway speeds, driven on the road under its own power at reduced speeds, towed on a rail at railroad speeds, or driven on the rail at medium-slow speeds.

In the embodiments described herein, the railroad trailer chassis is depicted and described as a railroad grinding vehicle, however it should be understood that any railroad maintenance and/or inspection operations equipment could incorporate the disclosed railroad trailer chassis and the disclosed work unit is a generic work unit that can be configured for a variety of purposes. For example, the railroad trailer chassis may be used for utility vehicles, inspection vehicles, or other track maintenance equipment.

Figure 1:
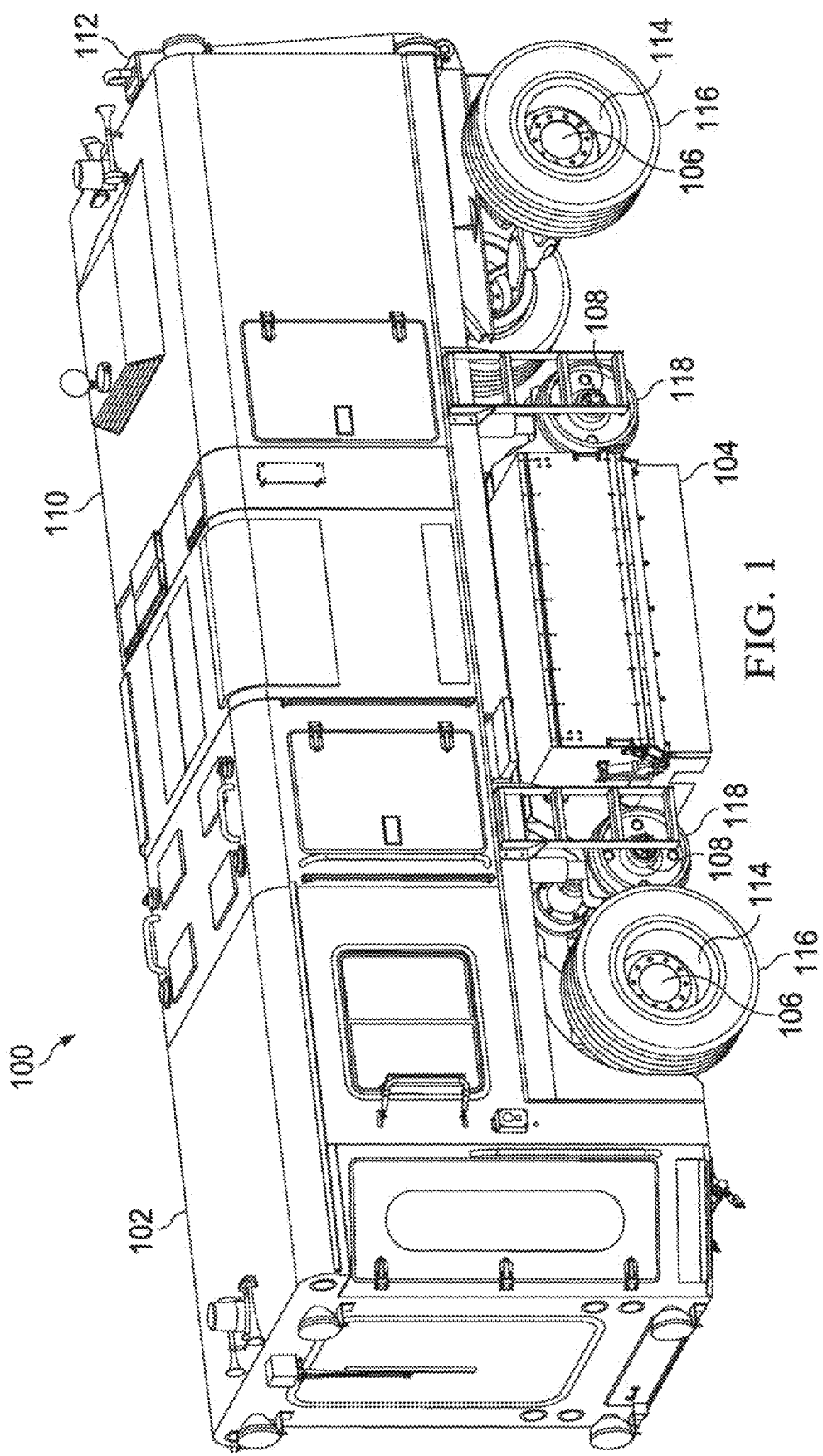
FIG. 1 illustrates a perspective view of a railroad trailer chassis, in accordance with one embodiment of the present disclosure.

FIG. 1 illustrates a perspective view of a railroad trailer chassis 100, in accordance with one embodiment of the present disclosure. In an embodiment, the railroad trailer chassis 100 may be configured as a railroad grinding vehicle 102 comprising a work unit 104, two or more road axles 106, two or more rail axles 108, an engine compartment 110, and a foldable towing hitch 112, among other components. However, it is understood that in other embodiments, the railroad trailer chassis 100 may be configured with any number of road and/or rail axles, as required by the specific application desired for the railroad trailer chassis 100. Each road axle 106 may be configured with two road wheels 114 and tires 116 and each rail axle 108 may be configured with two rail wheels 118.

In an embodiment, the work unit 104 may be interchangeable between various work units, including work units configured for utility vehicles, inspection vehicles, or other track maintenance equipment. In addition, more than one work unit 104 may be used on a single railroad trailer chassis 100 and the work unit 104 may be removably attached to the railroad trailer chassis 100 so that more than one work unit 104 may be used with a single railroad trailer chassis 100.

In an embodiment, the work unit 104 may be permanently attached to the railroad trailer chassis 100 and may be modular components. Further, in an embodiment, the work unit 104 and the railroad trailer chassis 100 may be manufactured as an integral, single component. By manufacturing the work unit 104 and the railroad trailer chassis 100 as an integral component, a single component may be structurally stronger and lighter weight when compared with a configuration comprising modular work unit 104 and railroad trailer chassis 100 components.

The railroad trailer chassis 100 may be configured with any variety of power plants and propulsion systems that are operable to propel the railroad trailer chassis in either road driving mode or rail driving mode. In one embodiment, the railroad trailer grinder may be powered by a Caterpillar Inc. C7.1 Tier 4 final power unit located within the engine compartment 110 and may be propelled by a parallel propel system.

In addition, the railroad trailer chassis 100 may further comprise components from traditional railroad maintenance or inspection vehicles. These components may include a stone grinding carriage, grinding pumps, an integral dust collection system, a low pressure water system, a track geometry inspection unit, a liquid based fire suppression system, or any other track maintenance or inspection equipment. In an embodiment, the stone grinding carriage may comprise multiple stone grinders using various grinding stone heads. Water and fuel capacities may be tailored to an individual operator's needs. In an embodiment, the railroad trailer chassis may be configured to store approximately 2000 liters of water and fuel, combined. The railroad trailer chassis may further comprise remote control operation systems, a water cannon, a high pressure water system, a PTZ camera system, rail profile measurement capabilities, a corrugation system, and the ability to link two or more chassis together to create a multiple car consist.

In an embodiment, both the road axles 106 and the rail axles 108 may be hydraulically powered and be operable to be moved between respective first and second positions. The road axles 106 may be powered, liftable, and steerable, and may be controlled via a control means in a cabin of the railroad trailer chassis 100. The rail axles 108 may also be powered and may be strong enough to support the weight of the entire railroad trailer chassis 100 when the rail axles 108 are extended downwardly, raising the road axles 106 and the railroad trailer chassis 100 above the rail.

In some embodiments, the railroad trailer chassis 100 may be controlled by a remote control external of the railroad trailer chassis 100 in a drone configuration, i.e., without a human inside the railroad trailer chassis 100.

In an embodiment, only the rail axles 108 may be hydraulically powered and operable to be moved between respective first and second positions, while the road axles 106 may be fixed in a first position on the railroad trailer chassis 100. The rail axles 108 may be strong enough to support the weight of the entire railroad trailer chassis 100 when the rail axles 108 are extended downwardly, raising the railroad trailer chassis 100 above the rail.

When an operator desires to move the railroad trailer chassis from the road to the rail, the railroad trailer chassis 100 may be operable to move between road and rail under its own power and without the use of a crane or other assistance. Alternatively, a crane or other piece of equipment may be used to move the railroad trailer chassis between the road and the rail.

Advantageously, the disclosed railroad trailer chassis 100 is a drivable trailer. Therefore, the trailer may fall under the less stringent Federal Highway Regulations, thus allowing it to be more easily approved for on-road use. In addition, as a drivable trailer, the work equipment on the railroad trailer chassis would not need to be configured to an over-the-road truck chassis native to a specific country. There would be no need to redesign the machine for different trucks or changing model year trucks. There is also the potential to use the mobile trailer platform as the basis for machines such as rail grinders, small inspection vehicles, utility vehicles, other track maintenance equipment, and the like.

Figure 2:
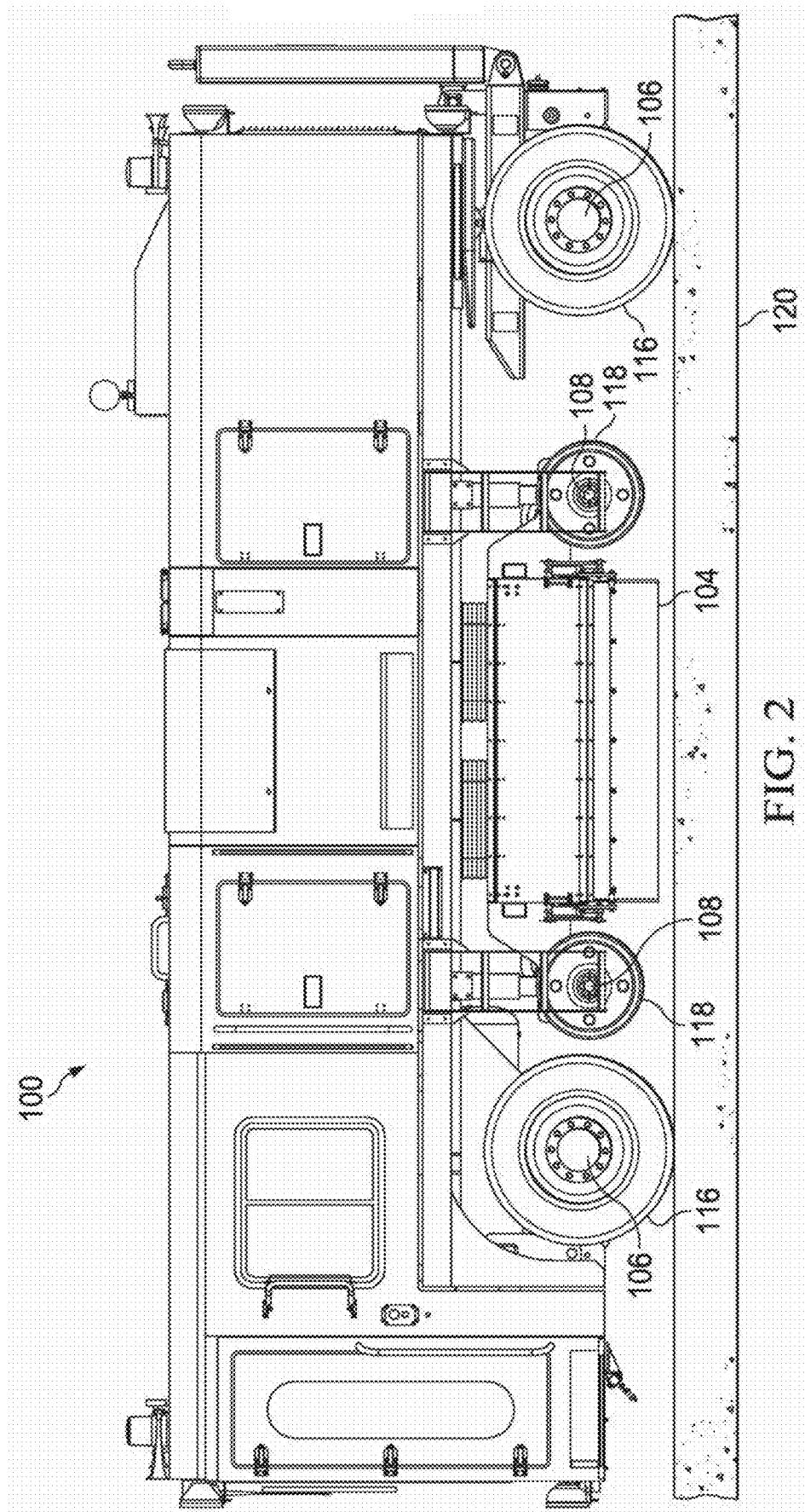
FIG. 2 illustrates a side view of the railroad trailer chassis of FIG. 1 in road mode, in accordance with one embodiment of the present disclosure.
Figure 3:
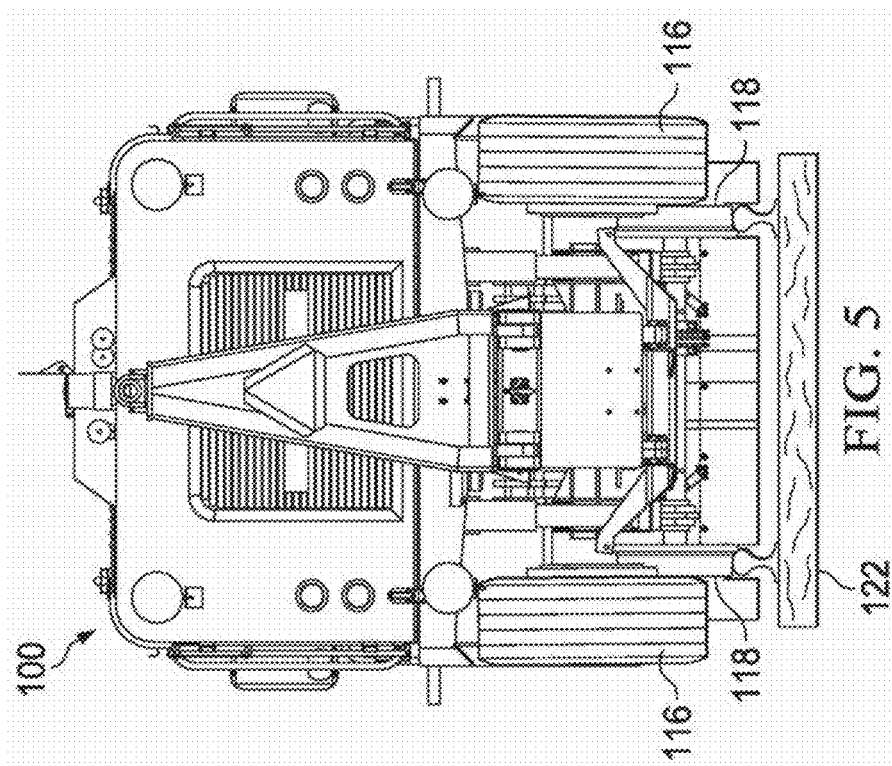
FIG. 3 illustrates an end view of the railroad trailer chassis of FIG. 2 in road mode, in accordance with one embodiment of the present disclosure.

FIG. 2 illustrates a side view and FIG. 3 illustrates an end view of the railroad trailer chassis 100 of FIG. 1 in road mode, in accordance with one embodiment of the present disclosure. As depicted in FIGS. 2 and 3, the road axles 106 may be in a first position wherein the road tires 116 interact with the surface of a road 120 and the rail axles 108 may be in a first position wherein the rail wheels 118 are raised above the surface of the road 120. In road mode, the work unit 104 may be raised above the surface of the road 120.

In road mode, the railroad trailer chassis 100 may be driven down the road 120 under its own power or may be towed down the road 120 by a tow vehicle such as a truck (not shown).

Figure 5:
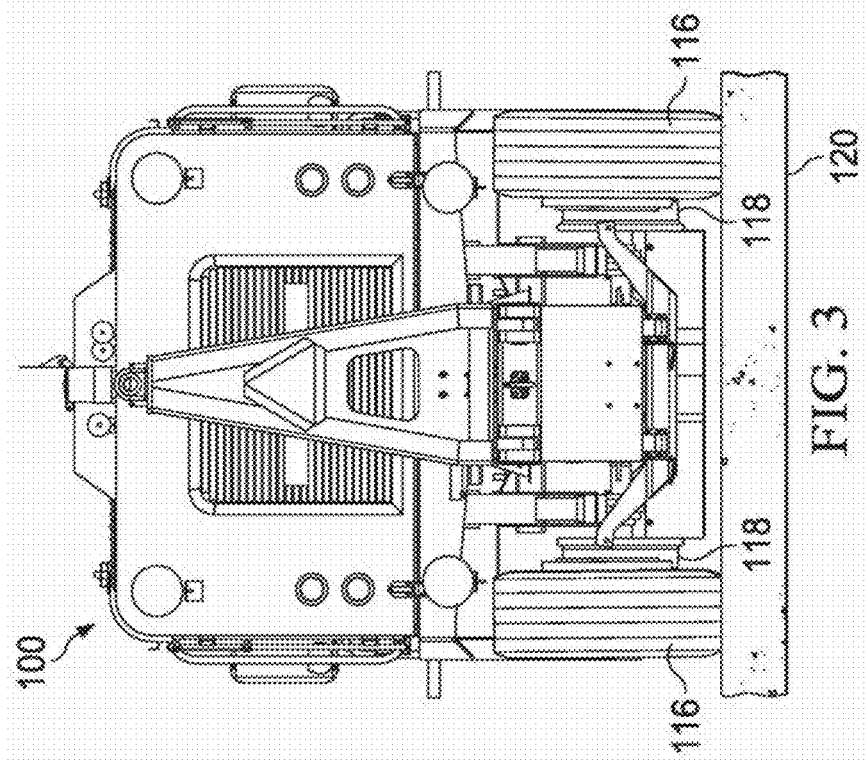
FIG. 5 illustrates an end view of the railroad trailer chassis of FIG. 4 in rail mode, in accordance with one embodiment of the present disclosure.
Figure 4:
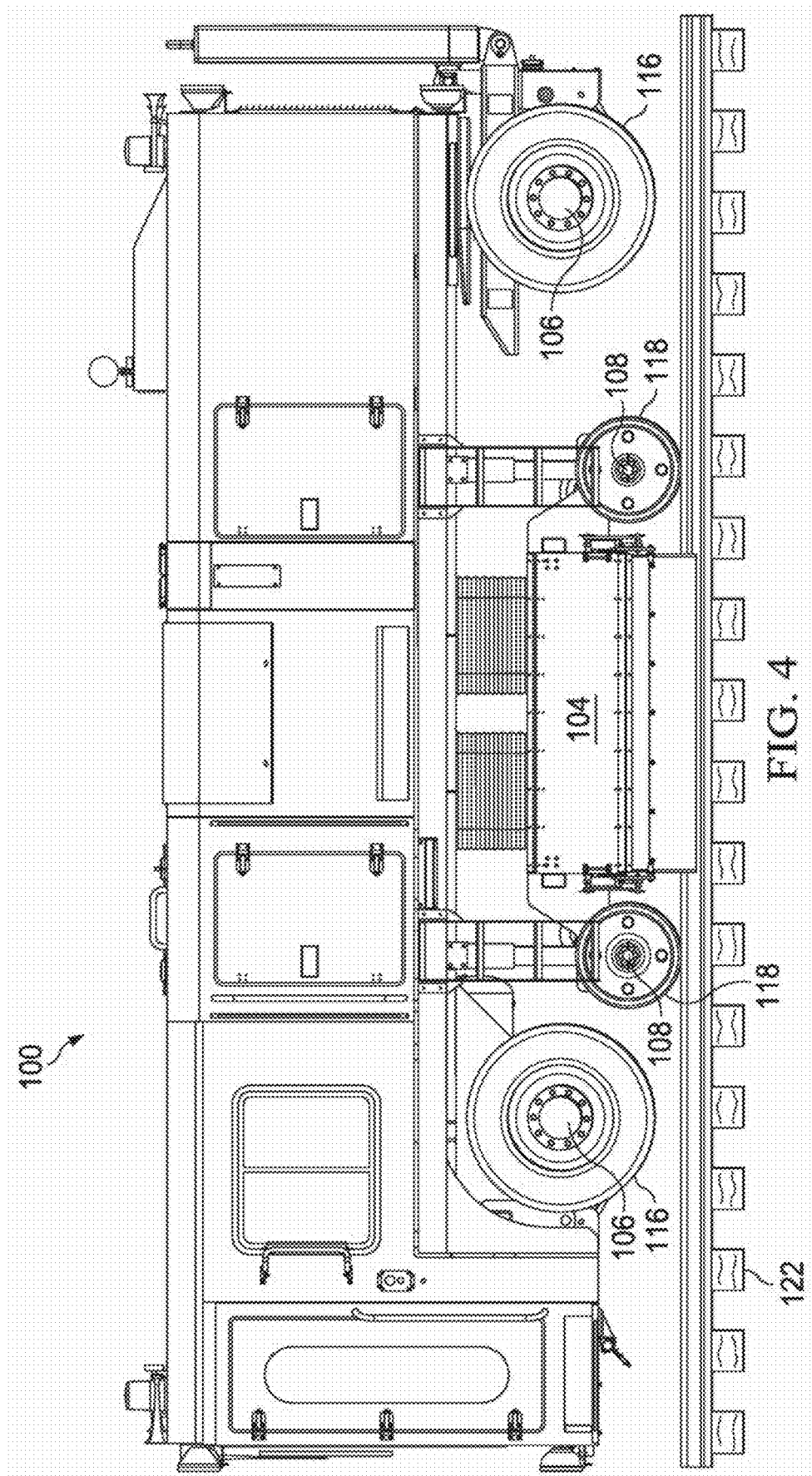
FIG. 4 illustrates a side view of the railroad trailer chassis of FIG. 1 in rail mode, in accordance with one embodiment of the present disclosure.

FIG. 4 illustrates a side view and FIG. 5 illustrates an end view of the railroad trailer chassis 100 of FIG. 1 in rail mode, in accordance with one embodiment of the present disclosure. In an embodiment, the road axles 106 may be in a second position wherein the road tires 118 are raised above the surface of a rail 122 and the rail axles 108 may be in a second position wherein the rail wheels 118 interact with the surface of the rail 122. In an alternative embodiment, the road axles 106 may remain in a first position and the rail axles 108 may be in a second position, lifting the railroad trailer chassis 100 such that the rail wheels 118 interact with the surface of the rail 122 and the road tires 116 are raised above the surface of the rail 122. In rail mode, the work unit 104 may be proximate to the surface of the rail 122.

In rail mode, the railroad trailer chassis 100 may be driven down the rail 122 under its own power or may be towed down the rail 122 by a tow vehicle such as a second railroad trailer chassis (not shown).

Figure 6:
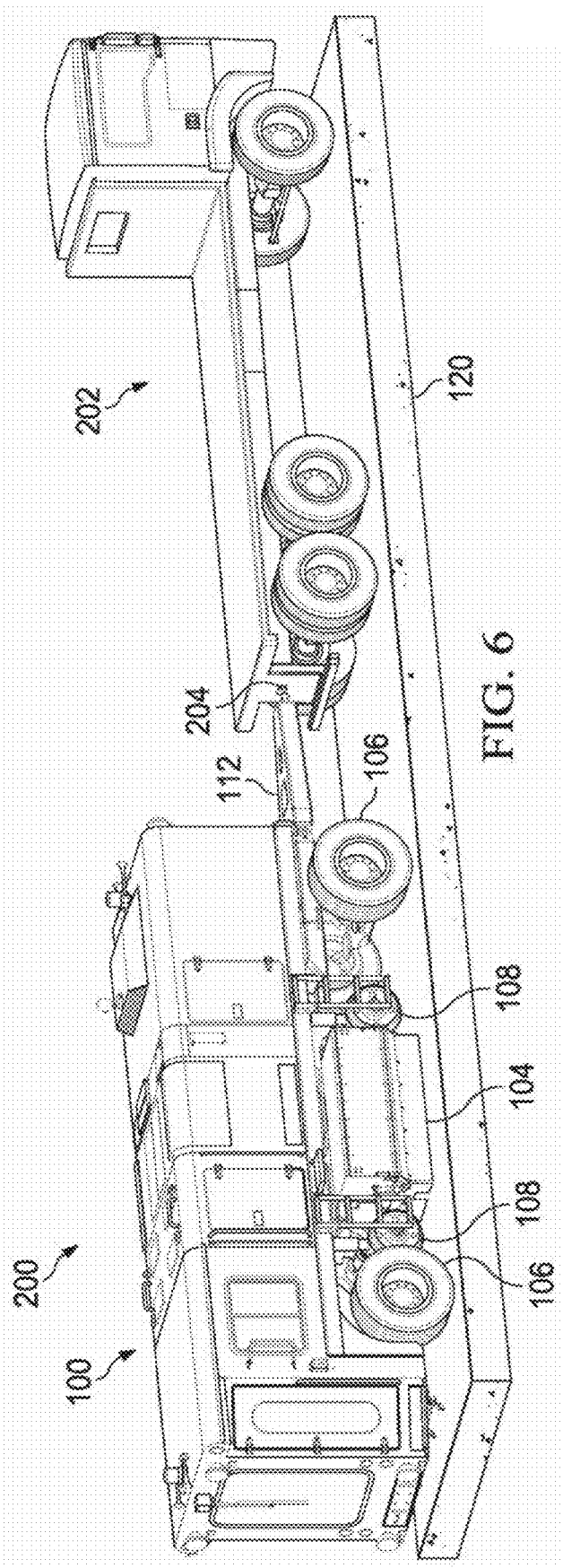
FIG. 6 illustrates a perspective view of a combination of the railroad trailer chassis of FIG. 1 and a truck, in accordance with one embodiment of the present disclosure.
Figure 7:
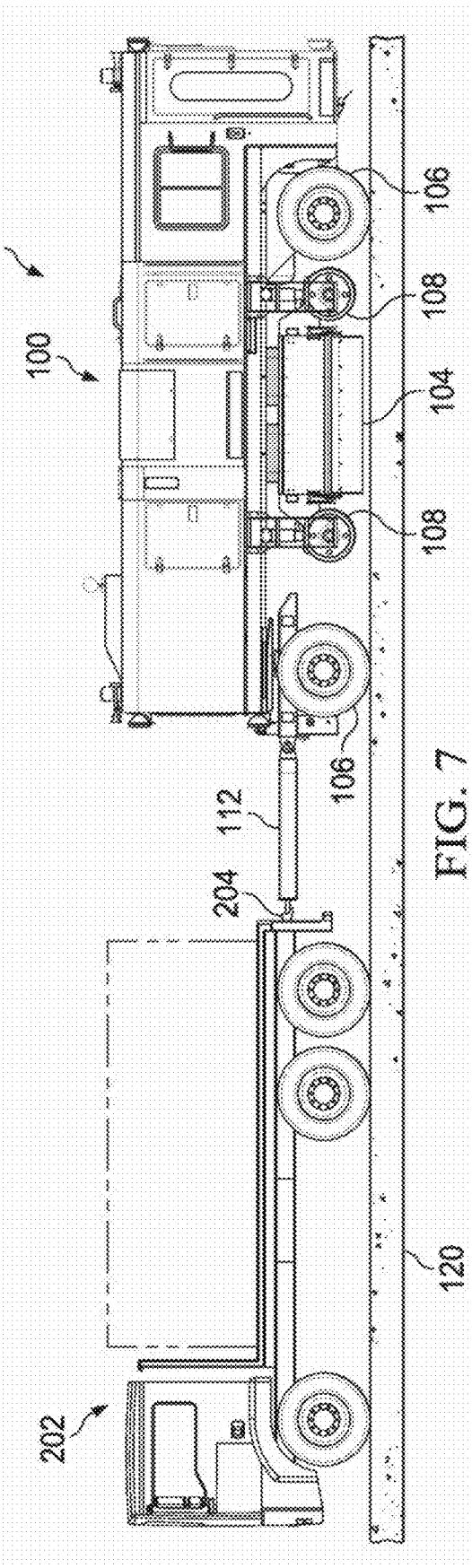
FIG. 7 illustrates a side view of the combination of the railroad trailer chassis and the truck of FIG. 6 in road tow mode, in accordance with one embodiment of the present disclosure.

FIG. 6 illustrates a perspective view and FIG. 7 illustrates a side view of a combination 200 of the railroad trailer chassis 100 of FIG. 1 and a truck 202 in road tow mode, in accordance with one embodiment of the present disclosure. In road tow mode, both the road axles 106 and the rail axles 108 of the railroad trailer chassis 100 are in their respective first positions. When an operator desires to tow the railroad trailer chassis 100 along a road 120 in row tow mode, the foldable trailer towing hitch 112 may be folded downwardly in to a substantially horizontal orientation and connected to the truck 202 or other tow vehicle at a trailer hitch 204. When the railroad trailer chassis 100 is operating under its own power on the road 120, the foldable trailer towing hitch 112 may be locked into a substantially vertical orientation, thereby moving the foldable trailer towing hitch 112 out of the way.

Figure 8:
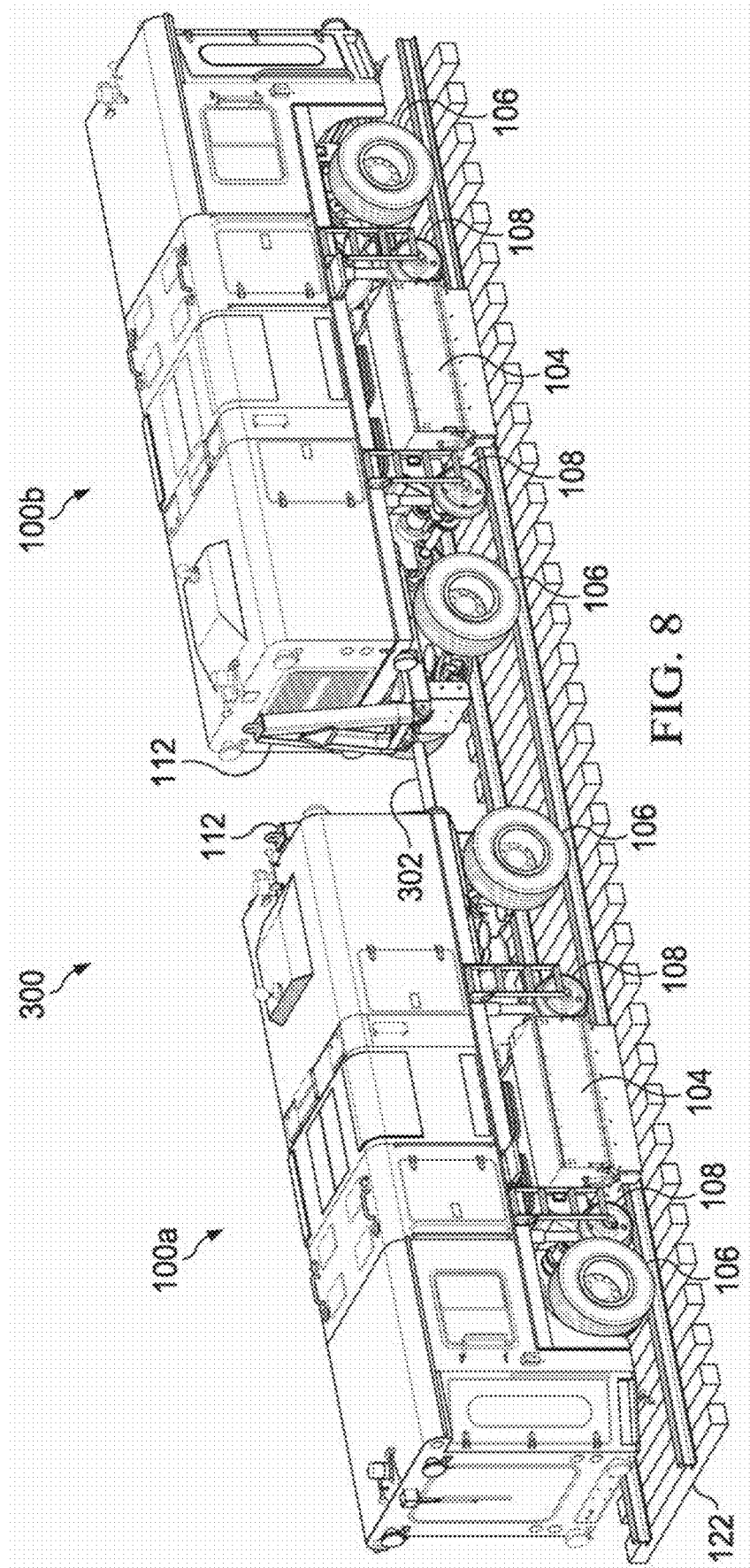
FIG. 8 illustrates a perspective view of a combination of two railroad trailer chassis of FIG. 1 in rail tow mode, in accordance with one embodiment of the present disclosure.

FIG. 8 illustrates a perspective view of a combination 300 of two railroad trailer chassis 100a, 100b of FIG. 1 in rail tow mode, in accordance with one embodiment of the present disclosure. In rail tow mode, the road axles 106 and the rail axles 108 of both the first railroad trailer chassis 100a and the second railroad trailer chassis 100b are in their respective second positions. When an operator desires to tow the first railroad trailer chassis 100a with the second railroad trailer chassis 100b down the rail 122 in rail tow mode, a rail connector 302 may be used to connect the first railroad trailer chassis 100a to the second railroad trailer chassis 100b. In rail tow mode, the foldable trailer towing hitch 112 of each railroad trailer chassis 100a, 100b may be locked into a substantially vertical orientation, thereby moving each foldable trailer towing hitch 112 out of the way.

Figure 9:
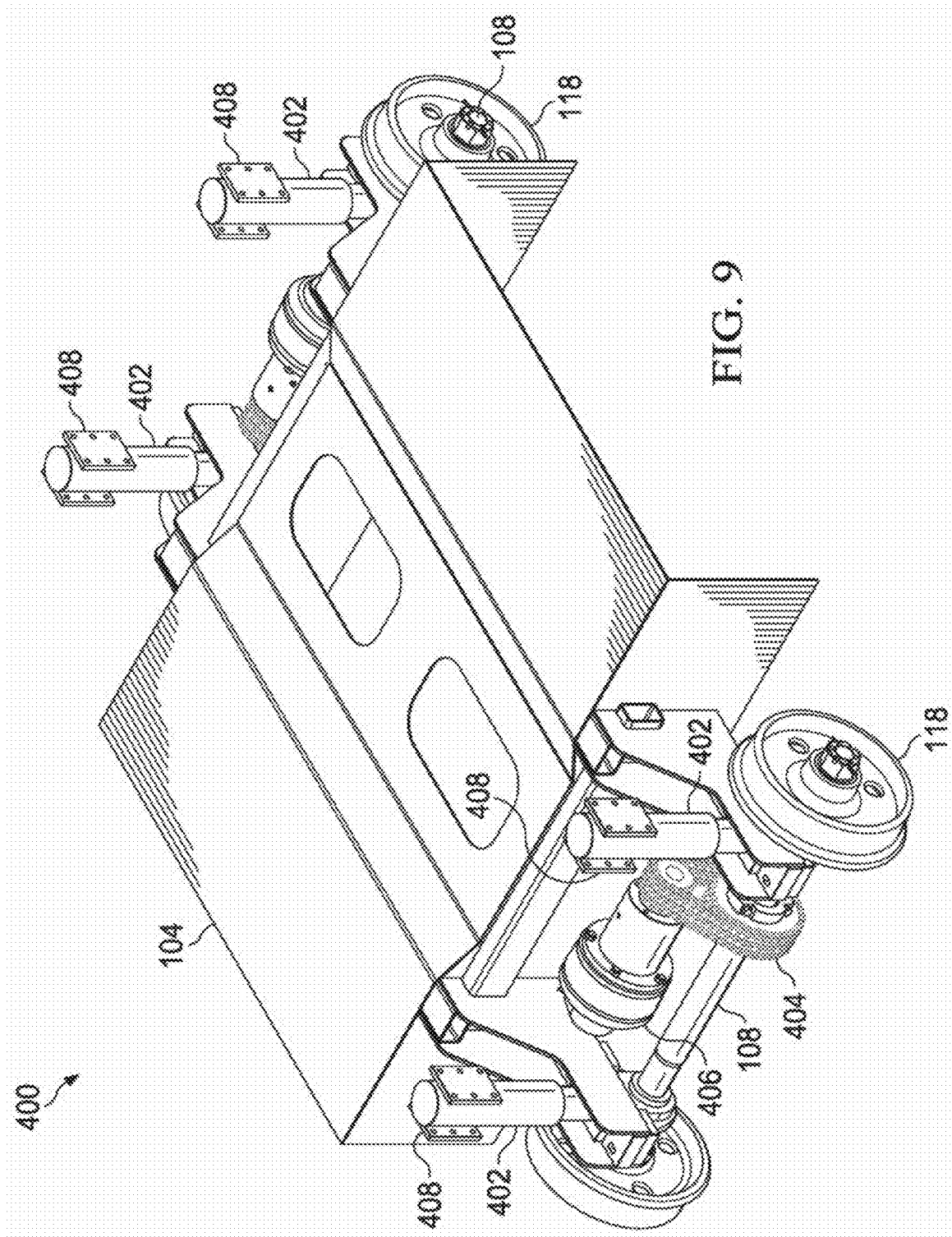
FIG. 9 illustrates a perspective view of an undercarriage unit of the railroad trailer chassis of FIG. 1 in road mode, in accordance with one embodiment of the present disclosure.
Figure 10:
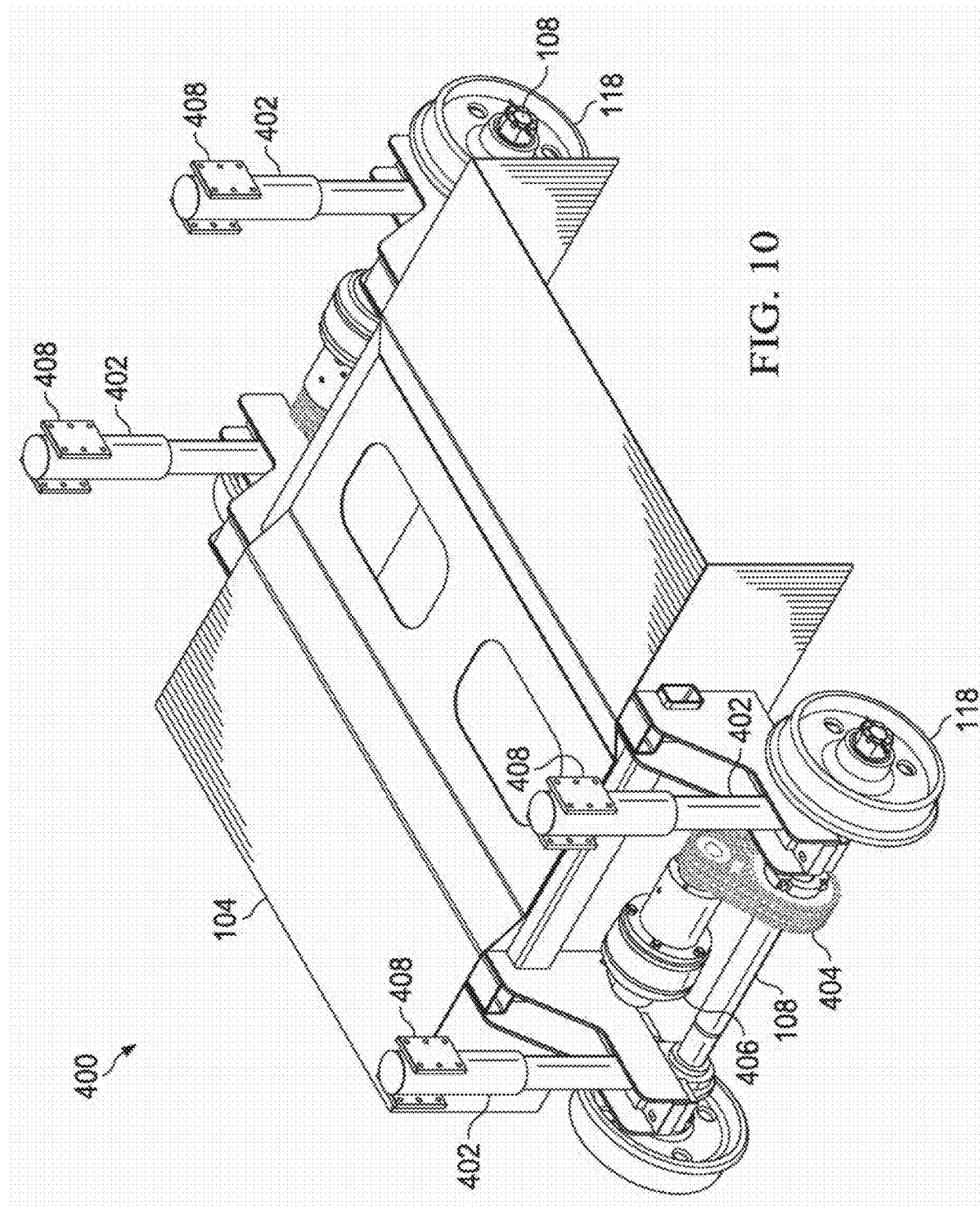
FIG. 10 illustrates a perspective view of the undercarriage unit of FIG. 9 in rail mode, in accordance with one embodiment of the present disclosure.

FIG. 9 illustrates a perspective view of an undercarriage unit 400 of the railroad trailer chassis of FIG. 1 in road mode, in accordance with one embodiment of the present disclosure. FIG. 10 illustrates a perspective view of the undercarriage unit 400 of FIG. 9 in rail mode, in accordance with one embodiment of the present disclosure.

The undercarriage unit 400 may comprise the work unit 104, which in an embodiment may be a grinder work unit. The rail axles 108 may be connected to the work unit 104 at one or more lifting devices 402 that are operable to move the rail axles 108 between their respective first and second positions. In an embodiment, the one or more lifting devices 402 may be hydraulic cylinders. Each lifting device 402 may have a mounting bracket 408 affixed to an upper portion of each lifting device 402 and may be connected to an underside of a frame of the railroad trailer chassis (not shown).

In road mode, as shown in FIG. 9, the one or more lifting devices 402 may be retracted such that the rail axles 108 are in their first positions, as discussed above, wherein the rail axels 108 and the work unit 104 are proximate to the underside of the frame of the railroad trailer chassis (not shown) and raised above the surface of the rail.

In rail mode, as shown in FIG. 10, the one or more lifting devices 402 may be extended such that the rail axles 108 are in their second positions, wherein the rail axles 108 and the work unit 104 are extended away from the underside of the frame of the railroad trailer chassis (not shown) and the rail wheels 118 are in contact with the surface of the rail. In rail mode, the rail axles 108 may be driven by a plurality of gears and/or chains 404 and a transmission 406 coupled with one or more rail propel motors (not shown) of the railroad trailer chassis that are operable to propel the railroad trailer chassis down the rail.

Figure 11:
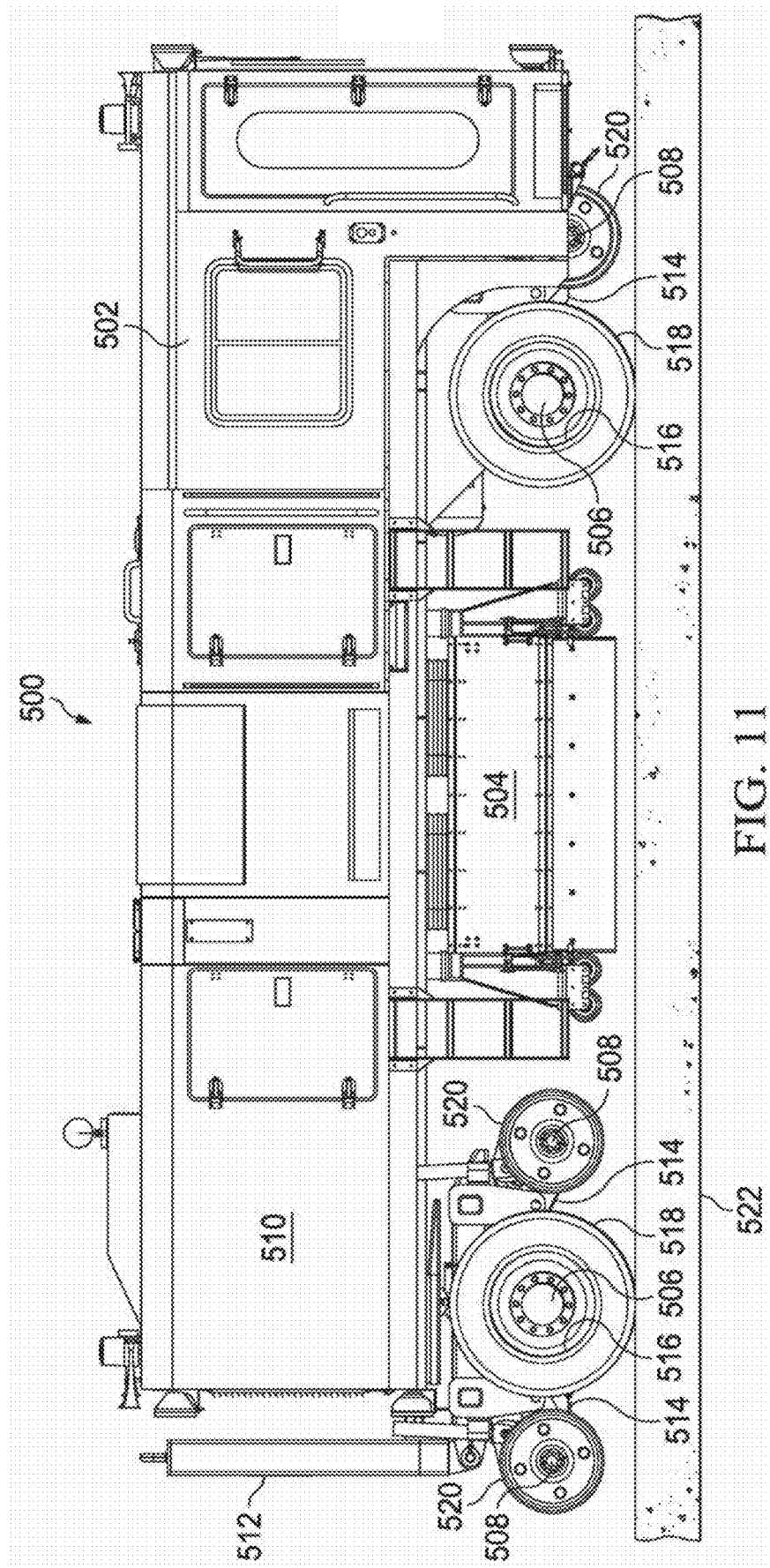
FIG. 11 illustrates a side view of a railroad trailer chassis with a friction drive system in road mode, in accordance with one embodiment of the present disclosure.

FIG. 11 illustrates a side view of a railroad trailer chassis 500 with a friction drive system in road mode, in accordance with one embodiment of the present disclosure. In an embodiment, the railroad trailer chassis 500 may be configured as a railroad grinding vehicle 502 comprising a work unit 504, two road axles 506, three rail axles 508, an engine compartment 510, a foldable towing hitch 512, and friction drive systems 514, among other components. However, it is understood that in other embodiments, the railroad trailer chassis 500 may be configured with any number of road and/or rail axles, as required by the specific application desired for the railroad trailer chassis 500. Each road axle 506 may be configured with two road wheels 516 and tires 518 and each rail axle 508 may be configured with two rail wheels 520.

In an embodiment, the work unit 504 may be interchangeable between various different work units, including work units configured for utility vehicles, inspection vehicles, or other track maintenance equipment. In addition, more than one work unit 504 can be used on a single railroad trailer chassis 500 and the work unit 504 may be removably attached to the railroad trailer chassis 500 so that more than one work unit 504 may be used with a single railroad trailer chassis 500.

In an embodiment, the work unit 504 may be permanently affixed to the railroad trailer chassis 500 and may be separate components. Further, in an embodiment, the work unit 504 and the railroad trailer chassis 500 may be manufactured as a single component. By manufacturing the work unit 504 and the railroad trailer chassis 500 as a single component, the single component may be structurally stronger and lighter weight when compared with a configuration comprising separate work unit 504 and railroad trailer chassis 500 components.

The railroad trailer chassis 500 may be configured with any variety of power plants and propulsion systems that are operable to propel the railroad trailer chassis in either road driving mode or rail driving mode. In one embodiment, the railroad trailer grinder may be powered by a Caterpillar Inc. C7.1 Tier 4 final power unit located within the engine compartment 510 and may be propelled by a parallel propel system.

In addition, the railroad trailer chassis 500 may further comprise components from traditional railroad maintenance or inspection vehicles. These components may include a stone grinding carriage, grinding pumps, an integral dust collection system, a low pressure water system, a track geometry inspection unit, a liquid based fire suppression system, or any other track maintenance or inspection equipment. In an embodiment, the stone grinding carriage may comprise multiple stone grinders using various grinding stone heads. Water and fuel capacities may be tailored to an individual operator's needs. In an embodiment, the railroad trailer chassis may be configured to store approximately 2000 liters of water and fuel, combined. The railroad trailer chassis may further comprise remote control operation systems, a water cannon, a high pressure water system, a PTZ camera system, rail profile measurement capabilities, a corrugation system, and the ability to link two or more chassis together to create a multiple car consist.

In an embodiment, the road axles 506 may be powered, liftable, and steerable, and may be controlled via a control means in a cabin of the railroad trailer chassis 100 or a remote control. The rail axles 508 may be operable to pivot from first positions to second positions with friction drive systems 514. The rail axles 508 and the friction drive systems 514 may be strong enough to support the weight of the entire railroad trailer chassis 500 when the rail axles 508 are pivoted downwardly, raising the railroad trailer chassis 500 off of the rail.

In road mode, the rail axles 508 are pivoted upwardly by the friction drive systems 514 such that the rail wheels 520 are not in contact with the road tires 518. As depicted in FIG. 11, the road axles 506 may be in a first position wherein the road tires 518 interact with the surface of a road 522 and the rail axles 508 may be in a first position wherein the rail wheels 520 are raised above the surface of the road 522. In road mode, the railroad trailer chassis 500 may be driven down the road 522 under its own power or may be towed down 522 the road by a tow vehicle such as a truck (not shown).

When both the road axles and the rail axles are in the their respective first positions, the railroad trailer chassis 500 is operable to be towed in road towing mode or driven down the road in road driving mode.

Figure 12:
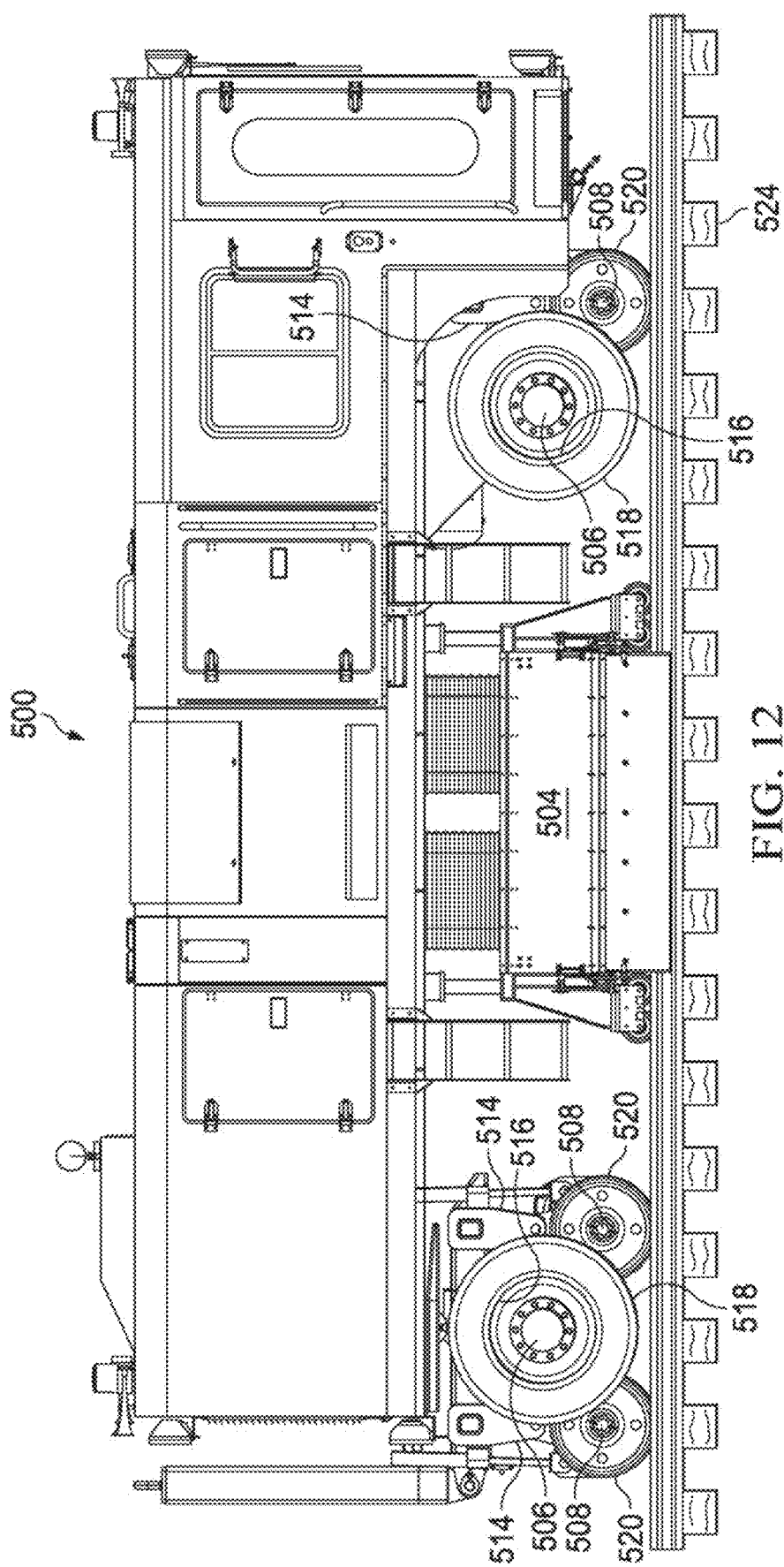
FIG. 12 illustrates a side view of the railroad trailer chassis of FIG. 11 in rail mode, in accordance with one embodiment of the present disclosure.

FIG. 12 illustrates a side view of the railroad trailer chassis 500 of FIG. 11 in rail mode, in accordance with one embodiment of the present disclosure. In road mode, the rail axles 508 are pivoted downwardly by the friction drive systems 514 such that the rail wheels 520 are in contact with the road tires 518. As depicted in FIG. 12, the rail axles 508 may be in a second position wherein the rail wheels 520 are lowered to the surface of a rail 524. In rail mode, the railroad trailer chassis 500 may be driven down the rail 524 under its own power or may be towed down the rail 524 by a tow vehicle such as a second railroad trailer chassis (not shown).

In rail mode, the road axles 506 drive the railroad trailer chassis 500 down the rail 524 by rotating the road axles 508 and the road tires 518 that are in friction contact with the rail wheels 520. The rear road axle 506 (road axle 506 closer to engine compartment 510) may utilize a dual friction drive 514 with one friction drive 514 on each side of the road axle 506 so that the dual friction drive 514 cradles the rear road tires 518. In an embodiment, the rear road axle 506 may be a pivoting fifth wheel setup, allowing the rear road axle 506 and the dual friction drive 514 to create a railroad bogie, which provides more stability and allows the railroad trailer chassis 500 to travel on tighter curves of the rail 524 as a result of the increased distance between the rail axles 508.

Figure 13:
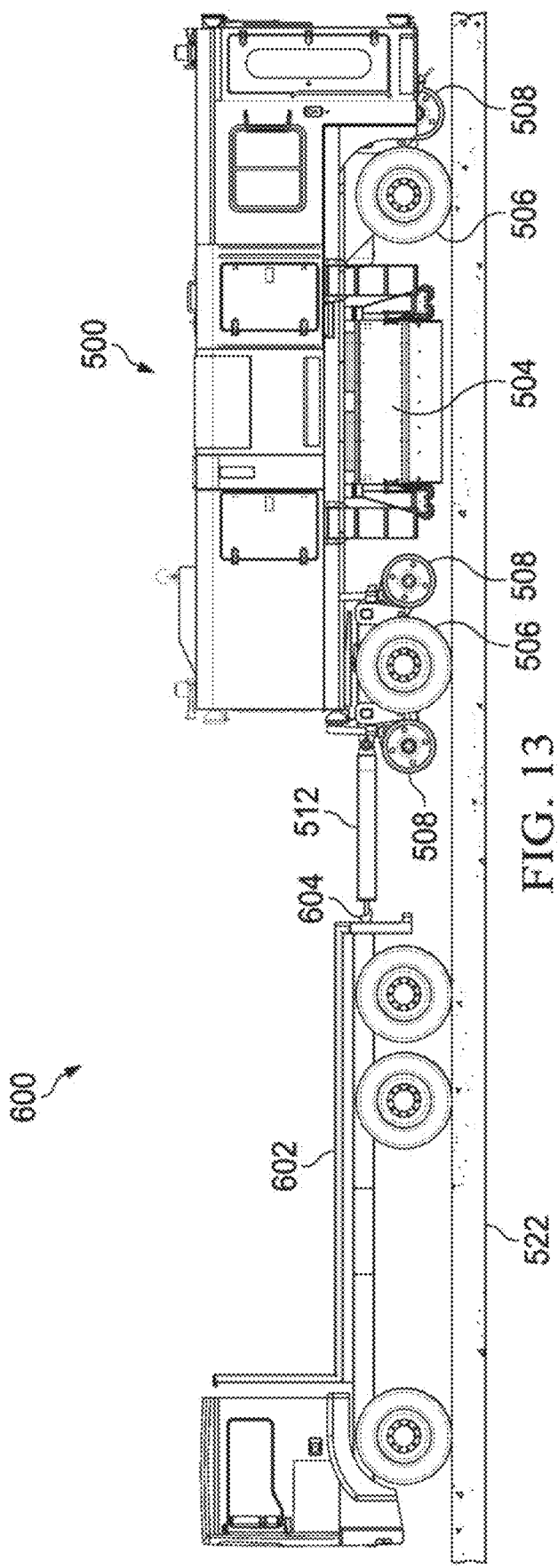
FIG. 13 illustrates a side view of a combination of the railroad trailer chassis of FIG. 11 and a truck in road tow mode, in accordance with one embodiment of the present disclosure.

The front road axle 506 (road axle 506 closer to engine compartment 510) may utilize a single friction drive 514 with one friction drive 514 forward of the front road axle 506, which does not pivot FIG. 13 illustrates a side view of a combination 600 the railroad trailer chassis 500 of FIG. 11 and a truck 602 in road tow mode, in accordance with one embodiment of the present disclosure. In road tow mode, both the road axles 506 and the rail axles 508 of the railroad trailer chassis 500 are in their respective first positions. When an operator desires to tow the railroad trailer chassis 500 along a road 522 in row tow mode, the foldable trailer towing hitch 512 may be folded downwardly in to a substantially horizontal orientation and connected to the truck 602 or other towing vehicle at a trailer hitch 604. When the railroad trailer chassis 500 is operating under its own power on the road (not shown), the foldable trailer towing hitch 512 may be locked into a substantially vertical orientation, thereby moving the foldable trailer towing hitch 512 out of the way.

Advantageously, utilizing a friction drive system 514 increases the wheelbase of the railroad trailer chassis 500, making the railroad trailer chassis 500 safer and more stable, and the propel motors for propelling the road axles 506 may be used for both road and rail travel.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A railroad trailer chassis, comprising: two or more road axles;
   two or more rail axles configured to be moved between first and second positions;
   a friction drive system coupled to a first rail axle of the two or more rail axles, the friction drive system configured to rotate the first rail axle between the first and second positions;
   a work unit configured to perform one or more railroad maintenance or operation functions when the railroad trailer chassis is driven in a rail mode, the work unit including a second rail axle of the two or more rail axles and configured to translate the second rail axle between the first and second positions; and
   a trailer towing hitch configured to, in a horizontal orientation, couple the railroad trailer chassis to a tow vehicle, and configured to rotate upward from the horizontal orientation; wherein
   the railroad trailer chassis is configured to be towed in a road mode when the two or more rail axles are respectively in the first positions, and the railroad trailer chassis is configured to be driven in the rail mode when the two or more rail axles are respectively in the second positions.

2. The railroad trailer chassis of claim 1, wherein the tow vehicle is configured to tow the railroad trailer chassis along a road.

3. The railroad trailer chassis of claim 2, wherein the two or more rail axles extend downwardly when moving from the first position to the second position such that the rail axles engage a rail and the two or more road axles are disposed above the rail.

4. The railroad trailer chassis of claim 1, wherein:
   the two or more rail axles each include rail wheels configured to travel on a rail;
   the two or more road axles each include road wheels configured to travel on a road;
   the road wheels are configured to contact the road while the two or more rail axles are in the first position; and
   the rail wheels are configured to contact the rail while the two or more rail axles are in the second positions.

5. The railroad trailer chassis of claim 1, wherein:
   the railroad trailer chassis is configured to be driven in the road mode when the two or more rail axles are respectively in the first positions; and
   the railroad trailer chassis is configured to be towed in the rail mode when the two or more rail axles are respectively in the second positions.

6. The railroad trailer chassis of claim 1, wherein the second rail axle of the two or more rail axles is disposed between the two or more road axles.

7. The railroad trailer chassis of claim 1, wherein:
   rail wheels of the rail axles are configured to be in friction contact with road tires of the road axles, and
   the friction drive system is configured to propel the railroad trailer chassis when the two or more rail axles are respectively in the second positions.

8. The railroad trailer chassis of claim 6, wherein the friction drive system comprises a dual friction drive.

9. The railroad trailer chassis of claim 1, further comprising a lifting device configured to move the second rail axle of the two or more rail axles and the work unit between first and second positions together.

10. The railroad trailer chassis of claim 1, wherein the trailer towing hitch is configured to move between:
    a stowed position in which the trailer towing hitch is in a substantially vertical orientation; and
    a towing position in which the trailer towing hitch is in the horizontal orientation.

11. The railroad trailer chassis of claim 10, further comprising a rail connector configured to couple the railroad trailer chassis to a rail vehicle.

12. The railroad trailer chassis of claim 11, wherein:
    the railroad trailer chassis is configured to be towed in a road mode while the trailer towing hitch is in the towing position; and
    the railroad trailer chassis is configured to be towed in a road mode while: the two or more rail axles are in the second positions; and the trailer towing hitch is in the stowed position.

13. The railroad trailer chassis of claim 1, further comprising:
    an engine configured to drive the two or more road axles while the railroad trailer chassis is in the road mode; and
    one or more rail propel motors configured to drive the two or more rail axles while the railroad trailer chassis is in the rail mode.

14. A vehicle comprising:
    a chassis;
    a plurality of road axles coupled to the chassis and configured to transport the vehicle on a road;
    a plurality of rail axles coupled to the chassis and configured to transport the vehicle on a rail, the plurality of rail axles movable between: a first position in which the rail axles are disposed above the road axles; a second position in which the rail axles are disposed below the road axles and configured to engage the rail; and
    a towing hitch coupled to the chassis and moveable between:
    a stowed position in which the towing hitch is in a substantially vertical orientation; and a towing position in which the towing hitch is in a substantially horizontal orientation;
a rail connector configured to couple the chassis to a rail vehicle; and
wherein the chassis is configured to be operable during:
a driven road mode in which the plurality of rail axles are in the first position and at least one road axle of the plurality of road axles is driven by the vehicle; a towed road mode in which the plurality of rail axles are in the first position and the towing hitch is in the towing position; a driven rail mode in which the plurality of rail axles are in the second position and at least one rail axle of the plurality of rail axles are driven by the vehicle; and
a towed rail mode in which the plurality of rail axles are in the second position and the chassis is coupled to the rail vehicle; and
while the chassis is in the towed rail mode:
the rail connector is coupled to the rail vehicle; and
the towing hitch is in the stowed position.

15. The vehicle of claim 14, wherein:
while the chassis is in the driven road mode, the at least one road axle is driven by an engine of the vehicle; and
while the chassis is in the driven rail mode, the at least one rail axle is driven by a rail motor of the vehicle.

16. The vehicle of claim 14, further comprising:
a friction drive system coupled to a first rail axle of the plurality of rail axles, the friction drive system configured to rotate the first rail axle between the first and second positions; and
a work unit having a second rail axle of the plurality of rail axles, the work unit configured to translate the second rail axle between the first and second positions.

17. The vehicle of claim 14, wherein:
the towing hitch includes a first end and a second end opposite the first end, the second end rotatably coupled to the chassis; and
a maximum transverse dimension at the second end is greater than a maximum transverse dimension at the first end.

18. The vehicle of claim 14, wherein the towing hitch is configured to be rotated in a direction away from the plurality of road axles when moving from the towing position to the stowed position.

19. A method of operating a vehicle, the method comprising:
self-propelling a hi-rail vehicle along a road, the hi-rail vehicle including a chassis, a plurality of road axles coupled to the chassis and configured to transport the vehicle on the road, a plurality of rail axles coupled to the chassis and configured to transport the vehicle on a rail, a rail connector, and a towing hitch coupled to the chassis and moveable between: a stowed position in which the towing hitch is in a substantially vertical orientation; and a towing position in which the towing hitch is in a substantially horizontal orientation;
positioning the towing hitch of the hi-rail vehicle to the stowed position; and
connecting the rail connector of the hi-rail vehicle to a second vehicle configured to tow the hi-rail vehicle along the rail.

20. The method of claim 19, further comprising:
self-propelling the hi-rail vehicle along the rail; and
connecting a rail connector of the hi-rail vehicle to a third vehicle configured to tow the hi-rail vehicle along the rail.

* * * * *

UNITED STATES PATENT AND TRADEMARK OFFICE
CERTIFICATE OF CORRECTION

PATENT NO.        : 10,946,704 B2                                  Page 1 of 1
APPLICATION NO.   : 15/894553
DATED             : March 16, 2021
INVENTOR(S)       : Ryan Meyer and Robert R. Schrunk, III It is certified that error appears in the above-identified patent and that said Letters Patent is hereby corrected as shown below:

On the Title Page

(57) Abstract, Line 5:
Delete "two or rail axles" and replace with -- two or more rail axles --.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*